US007286158B1

(12) United States Patent
Griebenow

(10) Patent No.: US 7,286,158 B1
(45) Date of Patent: Oct. 23, 2007

(54) METHOD AND SYSTEM FOR PROVIDING INTEGRATED REMOTE MONITORING SERVICES

(75) Inventor: Allan R. Griebenow, Dallas, TX (US)

(73) Assignee: Axcess International Inc., Carrollton, TX (US)

( * ) Notice: Subject to any disclaimer, the term of this patent is extended or adjusted under 35 U.S.C. 154(b) by 0 days.

(21) Appl. No.: 09/469,644

(22) Filed: Dec. 22, 1999

(51) Int. Cl.
*H04N 7/18* (2006.01)
*G06K 9/00* (2006.01)
*G08B 26/00* (2006.01)

(52) U.S. Cl. ........................ 348/156; 382/118; 340/505

(58) Field of Classification Search ........ 348/142-144, 348/154, 150, 156, 161, 169, 139; 382/118; 340/541, 505, 506, 5.81; 725/9, 12, 109, 725/105; 713/168; 379/201.01
See application file for complete search history.

(56) References Cited

U.S. PATENT DOCUMENTS

| | | | | |
|---|---|---|---|---|
| 4,217,588 | A | 8/1980 | Freeny, Jr. | 343/112 |
| 4,303,910 | A | 12/1981 | McCann | 340/572 |
| 4,385,231 | A | 5/1983 | Mizutani et al. | 235/382 |
| 4,459,474 | A | 7/1984 | Walton | 235/380 |
| 4,471,345 | A | 9/1984 | Barrett, Jr. | 340/572 |
| 4,528,663 | A | 7/1985 | Citta | 370/94 |
| 4,598,275 | A | 7/1986 | Ross et al. | 340/573 |
| 4,654,793 | A | 3/1987 | Elrod | 364/401 |
| 4,691,202 | A | 9/1987 | Denne et al. | 340/825.54 |
| 4,822,990 | A | 4/1989 | Tamada et al. | 235/492 |
| 4,833,807 | A | 5/1989 | McLean | 40/633 |
| 4,862,160 | A | 8/1989 | Ekchian et al. | 340/825.54 |
| 4,864,292 | A | 9/1989 | Nieuwkoop | 340/825.31 |
| 4,955,038 | A | 9/1990 | Lee et al. | 375/35 |
| 5,006,983 | A | 4/1991 | Wayne et al. | 364/401 |
| 5,051,741 | A | 9/1991 | Wesby | 340/825 |
| 5,153,878 | A | 10/1992 | Krebs | 370/95.1 |
| 5,175,729 | A | 12/1992 | Borras et al. | 370/79 |
| 5,220,557 | A | 6/1993 | Kelley | 370/50 |
| 5,227,803 | A | 7/1993 | O'Connor et al. | 342/442 |
| 5,266,925 | A | 11/1993 | Vercellotti et al. | 340/572 |
| 5,272,476 | A | 12/1993 | McArthur et al. | 340/870.13 |
| 5,287,269 | A | 2/1994 | Dorrough et al. | 364/408 |

(Continued)

FOREIGN PATENT DOCUMENTS

BE 1006392 A3 8/1994

(Continued)

OTHER PUBLICATIONS

International Search Report in PCT International Application No. PCT/US00/42802, dated May 18, 2001.

(Continued)

*Primary Examiner*—Gims Philippe
(74) *Attorney, Agent, or Firm*—Baker Botts L.L.P.

(57) ABSTRACT

A method and system for providing integrated remote monitoring services includes receiving and storing radio frequency identification (RFID) data from an RFID system at a remote facility of a subscriber. Video data is received from a video system at the facility and also stored. The subscriber is provided with access to the stored RFID and video data. The subscriber is also provided with access to and control of a video camera in the video system at the facility.

23 Claims, 4 Drawing Sheets

U.S. PATENT DOCUMENTS

| | | | | |
|---|---|---|---|---|
| 5,289,369 | A | 2/1994 | Hirshberg | 364/401 |
| 5,305,008 | A | 4/1994 | Turner et al. | 342/44 |
| 5,321,396 | A | 6/1994 | Lamming et al. | 340/825.49 |
| 5,351,052 | A | 9/1994 | D'Hont et al. | 342/42 |
| 5,371,899 | A | 12/1994 | Kuznicki et al. | 455/54.2 |
| 5,423,574 | A | 6/1995 | Forte-Pathroff | 283/75 |
| 5,425,032 | A | 6/1995 | Shloss et al. | 370/95.2 |
| 5,432,864 | A | 7/1995 | Lu et al. | 382/118 |
| 5,448,242 | A | 9/1995 | Sharpe et al. | 342/42 |
| 5,450,087 | A | 9/1995 | Hurta et al. | 342/42 |
| 5,453,747 | A | 9/1995 | D'Hont et al. | 342/42 |
| 5,471,212 | A | 11/1995 | Sharpe et al. | 342/51 |
| 5,488,376 | A | 1/1996 | Hurta et al. | 342/42 |
| 5,491,471 | A | 2/1996 | Stobbe | 340/825.34 |
| 5,502,806 | A | 3/1996 | Mahoney et al. | 395/161 |
| 5,523,737 | A | 6/1996 | Luna | 340/323 |
| 5,525,992 | A | 6/1996 | Froschermeier | 342/42 |
| 5,525,994 | A | 6/1996 | Hurta et al. | 342/51 |
| 5,539,394 | A | 7/1996 | Cato et al. | 340/825.54 |
| 5,541,928 | A | 7/1996 | Kobayashi et al. | 370/95.1 |
| 5,566,327 | A | 10/1996 | Sehr | 395/600 |
| 5,576,838 | A | 11/1996 | Renie | 386/117 |
| 5,581,297 | A | 12/1996 | Koz et al. | 348/152 |
| 5,621,412 | A | 4/1997 | Sharpe et al. | 342/51 |
| 5,629,981 | A * | 5/1997 | Nerlikar | 713/168 |
| 5,640,151 | A | 6/1997 | Reis et al. | 340/825.54 |
| 5,668,803 | A | 9/1997 | Tymes et al. | 370/312 |
| 5,686,902 | A | 11/1997 | Reis et al. | 340/825.54 |
| 5,689,442 | A | 11/1997 | Swanson et al. | 364/550 |
| 5,694,162 | A | 12/1997 | Freeny, Jr. | 348/12 |
| 5,694,514 | A | 12/1997 | Evans et al. | 386/46 |
| 5,721,733 | A | 2/1998 | Wang et al. | 370/332 |
| 5,737,330 | A | 4/1998 | Fulthorp et al. | 370/346 |
| 5,745,037 | A | 4/1998 | Guthrie et al. | 340/573 |
| 5,748,908 | A | 5/1998 | Yu | 395/244 |
| 5,754,541 | A | 5/1998 | Glisic et al. | 370/335 |
| 5,774,459 | A | 6/1998 | Charrat | 370/310 |
| 5,797,126 | A | 8/1998 | Helbling et al. | 705/5 |
| 5,805,082 | A | 9/1998 | Hassett | 340/928 |
| 5,808,587 | A | 9/1998 | Shima | 343/895 |
| 5,811,772 | A | 9/1998 | Lucero | 235/380 |
| 5,813,912 | A | 9/1998 | Shultz | 463/25 |
| 5,818,915 | A | 10/1998 | Hayes, Jr. et al. | 379/114 |
| 5,837,982 | A | 11/1998 | Fujioka | 235/382 |
| 5,839,058 | A | 11/1998 | Phillips et al. | 455/90 |
| 5,842,131 | A | 11/1998 | Yamane | 455/456 |
| D403,392 | S | 12/1998 | Briggs et al. | D21/814 |
| 5,848,395 | A | 12/1998 | Edgar et al. | 705/9 |
| 5,856,931 | A | 1/1999 | McCasland | 364/550 |
| 5,866,890 | A | 2/1999 | Neuner | 235/381 |
| 5,867,823 | A | 2/1999 | Richardson | 705/9 |
| 5,870,459 | A | 2/1999 | Phillips et al. | 379/114 |
| 5,872,887 | A | 2/1999 | Walker | 386/117 |
| D406,871 | S | 3/1999 | Briggs | D21/811 |
| D407,133 | S | 3/1999 | Briggs | D21/826 |
| 5,880,453 | A | 3/1999 | Wang et al. | 235/462.01 |
| 5,892,454 | A | 4/1999 | Schipper et al. | 340/825.37 |
| 5,894,589 | A | 4/1999 | Reber et al. | 455/2 |
| 5,918,211 | A | 6/1999 | Sloane | 705/16 |
| 5,932,869 | A | 8/1999 | Gottlich et al. | 235/493 |
| 5,946,444 | A | 8/1999 | Evans et al. | 386/46 |
| 5,946,613 | A | 8/1999 | Hayes, Jr. et al. | 455/406 |
| 5,956,259 | A | 9/1999 | Hartsell, Jr. et al. | 364/528.37 |
| 5,959,277 | A | 9/1999 | Lucero | 235/380 |
| 5,966,068 | A | 10/1999 | Wicks et al. | 340/286.01 |
| 5,966,654 | A | 10/1999 | Croughwell et al. | 455/414 |
| 5,973,613 | A | 10/1999 | Reis et al. | 340/825.44 |
| 5,978,770 | A | 11/1999 | Waytena et al. | 705/5 |
| 5,978,821 | A | 11/1999 | Freeny | 708/100 |
| 5,987,421 | A | 11/1999 | Chuang | 705/7 |
| 6,003,013 | A | 12/1999 | Boushy et al. | 705/10 |
| 6,028,626 | A * | 2/2000 | Aviv | 348/152 |
| 6,271,752 | B1 * | 8/2001 | Vaios | 340/541 |
| 6,294,953 | B1 | 9/2001 | Steeves | 329/341 |
| 6,385,772 | B1 * | 5/2002 | Courtney | 725/105 |
| 6,456,321 | B1 * | 9/2002 | Ito et al. | 348/143 |
| 2006/0140374 | A1 * | 6/2006 | Light et al. | 379/201.01 |

FOREIGN PATENT DOCUMENTS

| | | | |
|---|---|---|---|
| EP | 0 161 779 | A1 | 4/1985 |
| EP | 0 245 555 | A1 | 8/1986 |
| EP | 0 467 036 | A2 | 5/1991 |
| EP | 0 565 046 | A2 | 4/1993 |
| GB | 2 187 317 | A | 9/1987 |
| GB | 2187317 | A | 9/1987 |
| GB | 2 307 324 | A | 5/1997 |
| GE | DE 298 15 797 | U1 | 10/1998 |
| WO | WO91/17515 | | 11/1991 |
| WO | WO93/04537 | | 3/1993 |
| WO | WO95/12858 | | 5/1995 |
| WO | WO98/10358 | | 3/1998 |
| WO | WO98/11520 | | 3/1998 |

OTHER PUBLICATIONS

PCT Written Opinion in PCT International Application No. PCT/US00/42802, dated Apr. 8, 2002.

U.S. Appl. No. 09/298,559, "Low Power Receiver for Radio Tag and Method," filed by Wayne Steeves, Apr. 22, 1999.

"Radio Frequency Identification (RFID)—Standards, Common Applications, A Look Ahead, and Recommended Reading," http://www.aimglobal.org/techinfo/rfid/rfidintro.html, 4 pgs, Printed Jun. 7, 1999.

AIM International, Inc., "Radio Frequency Identification RFID—A Glossary: AIM International WP-98/001R," http://www.aimglobal.org/techinfo/rfid/aimrfidglossary.html, Printed Jun. 7, 1999.

AIM International, Inc., "Radio Frequency Identification RFID—A Basic Primer: AIM International WP-98/002R," http://www.aimglobal.org/techinfo/rfid/aimrfidbasics.html, Printed Jun. 7, 1999.

International Search Report in PCT International Application No. PCT/US 00/5772, dated Jul. 14, 2000.

International Search Report in PCT International Application No. PCT/US 00/ 33569, dated Apr. 5, 2001.

* cited by examiner

FIG. 1
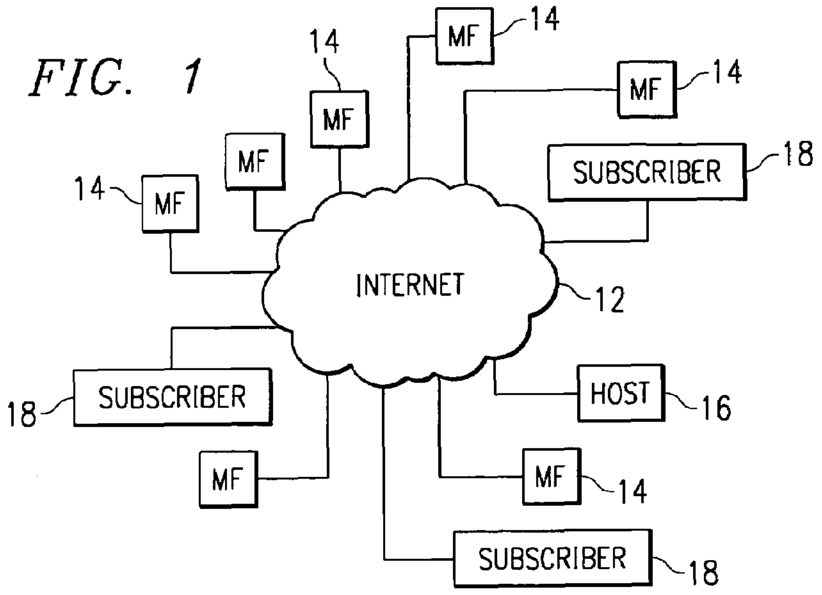
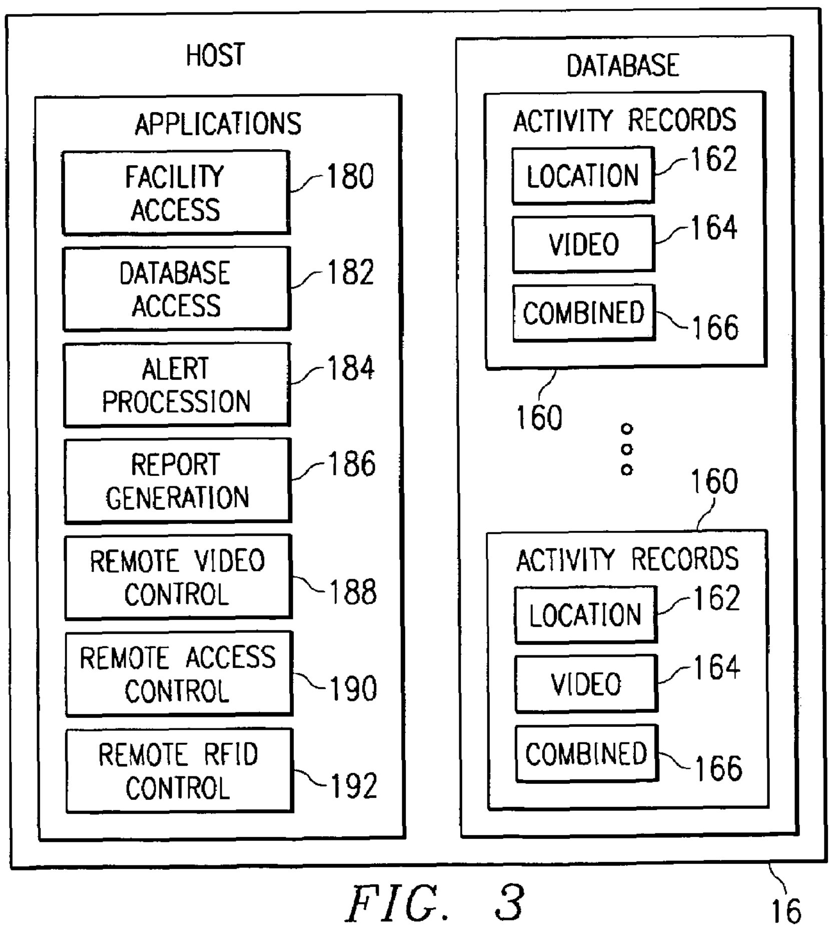
FIG. 3

METHOD AND SYSTEM FOR PROVIDING INTEGRATED REMOTE MONITORING SERVICES

TECHNICAL FIELD OF THE INVENTION

The present invention relates generally to the field of remote business management, and more particularly to a method and system for providing integrated remote monitoring services.

BACKGROUND OF THE INVENTION

Remote monitoring of a facility for fire, burglar and other alarms provides protection for a facility at low cost. For fire alarm systems, heat, flame, and/or smoke sensors are strategically placed around the facility to detect any fire at an early stage. Upon detection of a fire, in addition to a local alarm, an alarm is sent to a remote monitoring facility, which can then notify the fire department.

Similarly, homes and businesses often have a burglar alarm that is remotely monitored. Typically, sensors are placed on doors, windows, and at other areas susceptible to forced entry. In response to detection of a break-in, an alarm is sent to the remote monitoring facility, which can then dispatch personnel to check the facility.

A significant problem in monitoring alarms is the occurrence of false alarms. For burglar alarms, for example, personnel must generally be dispatched to the scene to determine whether a break-in is actually occurring or has occurred. In the event of a break-in, the need to confirm the alarm delays notification of the police. In the event no break-in occurred, the false alarm unnecessarily diverts personnel and resources to the scene.

More recently, remote monitoring capabilities have improved with the advent of video telesurvelance technologies. This technology allows remote personnel to connect to a video camera in a facility and to control or determine conditions at the facility. While this remote "look-in" capability provides significant advances over earlier monitoring systems, it does not provide an integrated solution for business owners.

SUMMARY OF THE INVENTION

The present invention provides a method and system for providing remote monitoring services that substantially reduce or eliminate the problems and disadvantages associated with previously developed systems and methods. In particular, the present invention provides integrated remote monitoring services that allow a subscriber to remotely monitor, evaluate, and control operations at a facility.

In accordance with one embodiment of the present invention, a method and system for providing integrated remote monitoring services includes receiving and storing radio frequency identification (RFID) data from an RFID system at a remote facility of a subscriber. Video data is received from a video system at the facility and also stored. The subscriber is provided with access to the stored RFID and video data. The subscriber is also provided with access to and control of a video camera in the video system at the facility.

More specifically, in accordance with a particular embodiment of the present invention, the RFID and video information may be received over the Internet and the subscriber provided access to the stored data and the video camera through a web portal. In this and other embodiments, the RFID data may be processed to generate a report for the subscriber or to determine and notify the subscriber of any alert conditions requiring his or her attention. In addition, the subscriber may initiate a polling event at the facility and receive results of the polling event.

In accordance with another aspect of the present invention, a method and system for providing identity verification for access activities is provided. The method and system elicits a radio response from an RFID tag at an access door of a secure area. Authorized access by a wearer of the RFID tag to the secure area is determined based on the radio response. A video image of the wearer at the access door is recorded and used to confirm the identity of the wearer.

In accordance with still another aspect of the present invention, a method for providing remote access services includes receiving a request by a person for access to a restricted area operated by a subscriber. A video image of the person requesting access to the restricted area and/or RFID tag information is also received. The request, including the video image, is transmitted to the subscriber for approval. In response to approval by the subscriber, the requested access is remotely allowed.

Technical advantages of the present invention include providing integrated remote monitoring services for owners and managers of a business. In particular, data is collected from the facility using automatic location identification technology and digital video networking and recording technology. The data is transmitted over the Internet to a central host site at which the data is stored and analyzed and may be accessed by the subscriber.

Another technical advantage of the present invention includes using the Internet to provide multi-media and other data-oriented information to subscribing business managers that is specific to the operation of each business location for the purpose of improving the efficiency of business operations. In particular, video, audio, and other data is collected at a business location and may be viewed live, processed, and stored at the business location or retrieved and processed at a central host site. The user subscribes to the service, which makes available the collected and processed data through a website portal.

Yet another technical advantage of the present invention includes providing video verification of activity at a remote facility. In particular, video images are collected and associated with radio frequency identification (RFID) activities. As a result, the identity of a person wearing or otherwise using a tag to access facilities, operations, and areas may be verified.

Still another technical advantage of the present invention includes providing a method and system for remotely notifying a manager of a facility of an alert condition at the facility. In particular, RFID data is collected and processed at a facility to determine whether a user-defined or other alert condition exists. Alert conditions may be unauthorized access to an area, an insufficient number of employees at the facility or performing a specified task, or other conditions that affect operations of the business. The manager is immediately notified of such alerts to allow corrective action to be taken.

Still another technical advantage of the present invention includes providing a method and system for providing remote access services to a subscriber. In particular, request by a person to access a restricted area during off-hours or other unattended times is combined with RFID data, if available, and a video image and forwarded to a central host site for approval or routing to a subscriber for his or her approval. As a result, employees need not travel to or wait at a location for deliveries or the arrival of others. Thus, operating costs of the business are reduced.

Still another technical advantage of the present invention includes providing a method and system for gathering marketing and customer preference information. In particular, remote controlled cameras at a store may be accessed and controlled to determine customer preferences and actions. As a result, travel to the physical location is unnecessary which reduces costs and increases the number of surveys that can be taken. In addition, interference with normal operations of a facility are eliminated.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, and in which:

FIG. 1 is a block diagram illustrating a remote monitoring system in accordance with one embodiment of the present invention;

FIG. 3 is a block diagram illustrating details of the central host of FIG. 1 in accordance with one embodiment of the present invention;

DETAILED DESCRIPTION OF THE INVENTION

Figure 2:
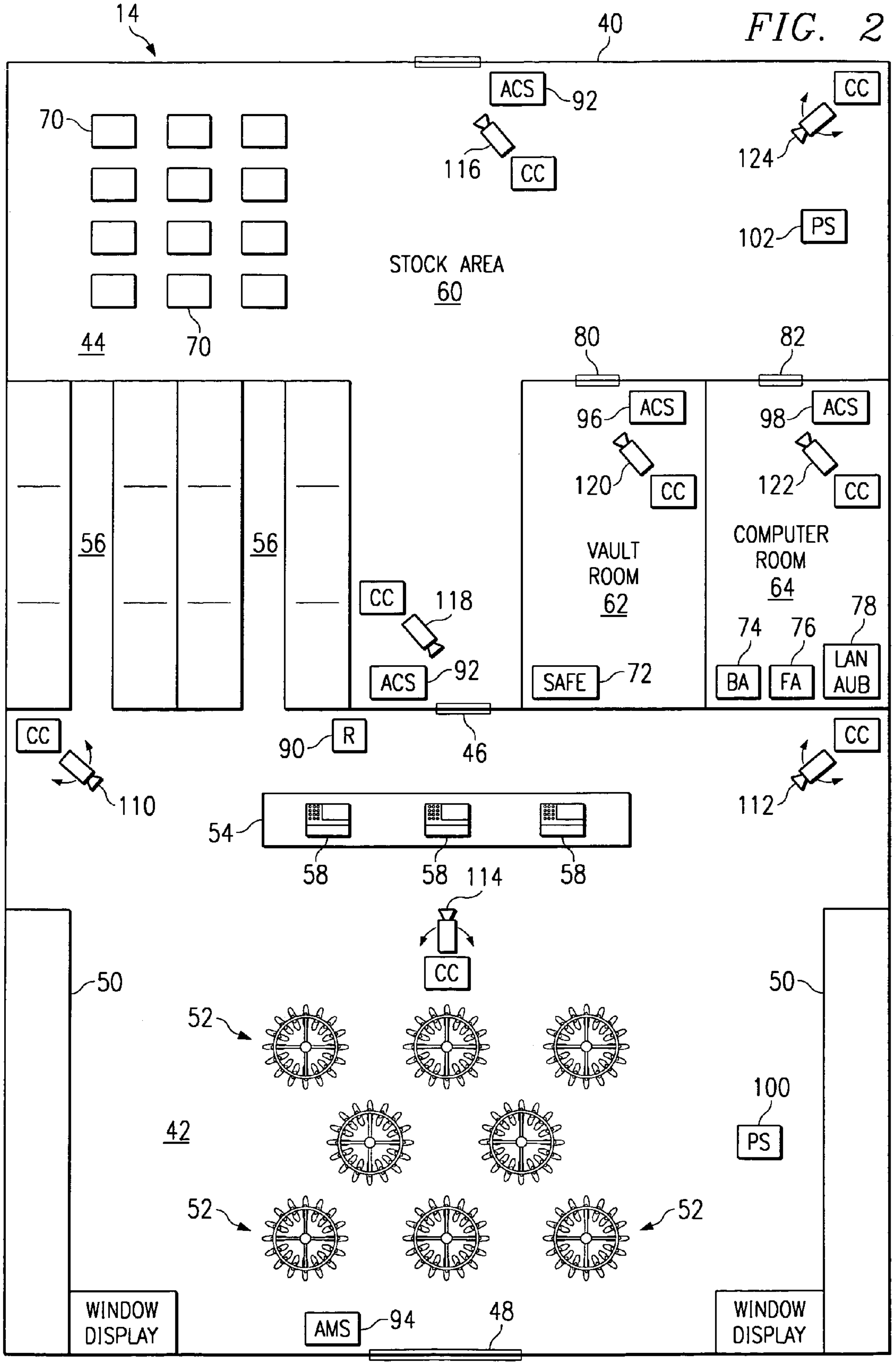
FIG. 2 is a top plan view of a monitored facility of FIG. 1 in accordance with one embodiment of the present invention.

FIG. 1 illustrates a remote monitoring system 10 in accordance with one embodiment of the present invention. In this embodiment, the remote monitoring system 10 uses the Internet to provide connectivity between remote elements of the system 10. It will be understood that other suitable networks and components of networks may be used as part or in place of the Internet 12 to provide connectivity between elements of the system 10.

Referring to FIG. 1, the remote monitoring system includes geographically distributed monitored facilities (MF) 14, a central host 16, and subscribers 18. The monitored facilities 14 each include a data collection system that collects video, audio, location, and other data at the facility 14 based upon the specific business needs of a subscriber 18. The data, once collected, may be viewed live, processed and stored at the monitored facility 14, or retrieved and processed at the central host 16. The subscriber 18, which may be an owner or manager of the business, accesses certain live and processed data relative to the operation of the facility 14 through a website portal defined by the central host 16. The subscriber 18 may access the website portal with a personal computer or any other suitable personal device capable of connecting to the Internet through a wireline, wireless or other suitable link.

FIG. 2 illustrates details of a monitored facility 14 in accordance with one embodiment of the present invention. In this embodiment, the monitored facility 14 is a retail clothing store 40. It will be understood that the present invention may be used in connection with any other suitable type of business. For example, the monitored facility 14 may be any type of store selling goods to consumers, a doctor or other suitable type of office, an office building or complex, a manufacturing facility or plant, a warehouse or storage yard, or any other suitable structure at which one or more workers perform tasks.

Referring to FIG. 2, the retail store 40 includes a sales floor 42 and the back area 44 supported by a security door 46. The sales floor 42 is accessed by the public through access doors 48. The sales floor 42 includes clothing shelves 50, clothing racks 52, and a sales counter 54. The clothing shelves and racks 50 and 52 display articles of clothing to consumers for selection and purchase, and dressing rooms 58. Typically, clothing is displayed on the shelves 50 and racks 52 to maximize consumer interest and purchases. Such purchases are rung up by employees of the store on registers 58 at the sales counter 54. Money, checks, and receipts for other forms of payment are all initially stored in the registers 58.

The back area 44 includes a stock area 60, a vault room 62, and a computer room 64. The stock area 60 stores inventory 70 for later display on the sales floor 42. The vault room 62 secures a safe 72 that temporarily stores funds removed from the registers 58 prior to transfer to a bank. The computer room 64 secures burglar and fire alarm equipment 74 and 76 as well as a local computer system 78 for monitoring, controlling, processing, recording, local activities and for transmitting and receiving information to and from the central host 16. Local processing of data may be completely performed by the local computer system 78 or may be distributed to the sensors or other devices throughout the store 40. In the Internet embodiment, the computer system 78 includes a local area network (LAN) hub/gateway to communicate with the central host 14 over the Internet 12. The vault and computer room 62 and 64 are each accessed by access doors 80 and 82, respectively.

The computer system 78 collects data using automatic location identification technology and digital video networking and recording technology. In one embodiment, the automatic location identification technology comprises radio frequency identification (RFID) tag technology that gathers data by requiring assets to physically touch a reader (passive location technology) or by passing near to a reader (active location technology). Active tags activate, or wake-up when they pass through or receive a localized radio frequency signal and then transmit their ID number to a reader. The RFID data identifies where certain personnel or physical assets of the business are or have been in or around the store 40. The RFID data is collected as the assets enter or leave the store 40 and as they move into or out of certain defined areas, or zones.

In a particular embodiment, the RFID system and tags may be implemented in accordance with the systems and tags disclosed in U.S. application Ser. No. 09/298,982 that is entitled "Distributed Tag Reader System and Method", U.S. application Ser. No. 09/357,435 that is entitled "Radio Frequency Identification System and Method", U.S. application Ser. No. 09/298,559 that is entitled "Low Power Receiver for Radio Tag and Method", U.S. application Ser. No. 09/258,974 that is entitled "High Sensity Demodulator for a Radio Tag and Method", U.S. application Ser. No. 08/789,148 entitled "Radio Tag System and Method With Improved Tag Interference Avoidance", U.S. application Ser. No. 09/357,669 entitled "Dual Frequency Radio Tag for Radio Frequency Identification System, and U.S. application Ser. No. 09/357,688, all of which are incorporated herein by reference.

For the illustrated embodiment, the store 40 includes a centralized receiver, or reader, 90 for reading responses from tags, access control systems 92 for controlling access to the back area 44 and an access monitoring system 94 for monitoring tags entering through the public doors 48. The access control and monitoring systems 92 and 94 each transmit the wake-up signal to tags in their area to elicit a response which is received by the receiver 90 and passed to the computer system 78. In this way, access to the back area 44 may be fully controlled with only authorized personnel having an RFID tag allowed access. Thus, while the general public may freely access the sales floor 42, access to the back room 44 is limited to only employees and managers of the store 40. Inclusion of the access monitoring system 94 allows the egress and ingress of all employees entering or leaving the store 40 to be monitored and recorded.

Additional access control systems 96 and 98 are provided separately for the vault room 62 and the computer room 64 to provide additional security to those areas. Thus, while all employees may be allowed access to the back area 44, only specific employees or an owner may be allowed access to the vault room 62 and the computer room 64.

The location data may also include polling stations 100 and 102. The polling station 100, in response to a command from the local computer system 78 polls tagged inventory on the sales floor 42. Responses from the tags may be collected by the polling station 100 or the receiver 90 and forwarded to the local computer system 78 for processing. Similarly, polling station 102, in response to a command from the local computer system 78, may poll tagged items in the inventory 70. Responses from the tags may be received by the polling station 102 or the receiver 90 and passed to the computer system 78 for recordation and processing. Typically, high value items will be tagged to inhibit their theft. The computer system 78 may initiate polling at specified times, at a specified period, in response to an alarm condition, or in response to an operator or subscriber request from or through the central host 16.

The location data may be recorded at the store 40 and transmitted later or transmitted live over the Internet 12 where it is collected by the central host 16, processed, and then made available to the subscriber 18. In one embodiment, the RFID data may include the identification number of the tag, the antenna or activator ID telling where the tag was activated, and the reader identification that received the response signal from the tag.

The video and audio data at the store 40 is collected from cameras and microphones positioned in and around the store 40. The video may be black and white video, color video, infrared video, or any other suitable visual information capable of providing information at a scene. The cameras may be digital network video cameras, which can connect directly to a data network, or they may be any standard video camera connected to a conversion and compression device, which records and/or prepares the video data for transmission over the Internet 12.

The video data collection and/or transmission may be initiated via an external trigger or alarm which indicates a business condition exists where the video data must be transmitted live or recorded for later review. Video data is also available for subscribers 18 or the host service provider 16 to dial into at any time to view live video or to initiate video recording. In addition, Video data may be recorded at the store 40 and transmitted later or transmitted live over the Internet 12 or may be recorded the central host 16 or transmitted live to the subscriber 18.

In one embodiment, the cameras and equipment of the video and audio network may be implemented in accordance with U.S. Pat. No. 4,857,991 entitled "Method and System for Decompressing Color Video Feature Encoded Data", U.S. Pat. No. 4,816,901 entitled "Method and System for Compressing Color Video Data", U.S. Pat. No. 4,843,466 entitled "Method and System for Decompressing Color Video Slope Encoded Data", U.S. Pat. No. 4,849,807 entitled "Method and System for Compressing Color Video Feature Encoded Data", U.S. Pat. No. 4,847,677 entitled "Video Telecommunication System and Method for Compressing and Decompressing Digital Color Video Data", U.S. Pat. No. 4,857,993 entitled "Method and System for Decompressing Digital Color Video Statistically Encoded Data", U.S. Pat. No. 4,914,508 entitled "Method and System for Compressing and Statistically Encoding Color Video Data", U.S. Pat. No. 5,140,142 entitled "Method for Color Encoding and Pixelization for Image Reconstruction", U.S. Pat. No. 5,838,266 entitled "Data Processing Apparatus and Method Using Data Compression (Delta), U.S. patent application Ser. No. 09/045,730 filed on Mar. 20, 1998 entitled "Conditional Update Method for Video Compression", U.S. Pat. No. 6,061,475 entitled "Video Compressed Apparatus and Method, and U.S. Pat. No. 6,005,638, which are all hereby incorporated by reference.

For the illustrated embodiment, video and audio data are collected by a number of digital cameras distributed throughout the store 40. Each camera includes a camera controller (CC) for panning, tilting, and zooming the camera to focus on a desired area of the store 40. In particular, sales floor cameras 110 and 112 provide broad coverage of the sales floor 42 and may be used to view the movements of customers and interaction between customers and employees on the sales floor 42. A sales counter camera 114 is located in front of the sales counter 54 to provide close-up coverage of the registers 58. In the back area 44, camera 116 provides coverage of a back door, camera 118 provides coverage of the intermediate door 46 between the back area 44 and the sales floor 42, vault camera 120 provides coverage of the vault door 80, and computer camera 122 provides coverage of the computer door 82. Thus, all access to the back room 44 and the vault and computer rooms 62 and 64 may be recorded. In addition, back area camera 124 may provide broad coverage of the stock area 60.

Video, audio, location, and other data gathered by the sensors in the store 40 are passed to the local control system 78 for recordation, processing, and transmittal to the central host 16. The local computer system 78 may combine location data with multi-media data to provide enhanced and integrated services for subscribers 18. In a particular embodiment, data is streamed out of the location and video system. The location data is embedded into video frame headers for transmission and storage.

Combined location and video data may be generated in an application in which tag transmissions may be used to activate video recording from a camera pointed toward a zone activation point to capture tag activations. The video records the tagged activation event thereby validating the person or asset with a tag at the time of the read. The combined tag and video data can be stored for later review or transmitted live over the Internet 12 to the central host 16 or to the subscriber 18.

FIG. 3 illustrates the central host 16 in accordance with one embodiment of the present invention. In this embodiment, the central host 16 is implemented as a website portal on a server. It will be understood that the host 16 may be implemented by any other suitable computing device capable of communicating information with a remote device over a network.

Referring to FIG. 3, the host 16 includes database 150 for storing data received from the monitored facilities 14 and applications 152 for processing the data and reporting the information to the subscribers 18. Generally described, the central host 16 receives, stores, and processes video, audio, and location data transmitted from the monitored facilities 14 and makes the data available to the subscribers 18. In addition, the host 16 may generate and transmit notice of certain events to the subscriber 18.

The database 150 includes activity records 160 for each of the monitored facilities 14. The activity records 160 each store location information 162, video information 164, and combined location and video information 166. The location information 162 is generated by RFID reads at the monitored facilities 14. The location data 160 may include time and attendance records, access to restricted areas information, asset movement information, and asset poll results. The time and attendance records provided to the subscriber 18 to automate the payroll data input process, to counsel an employee regarding deficiencies in his or her attendance, and combined with video data to provide a video record of attendance. Access to restricted area information allows the subscriber to track personnel entering inventory rooms, computer rooms, rooms with safes and other critical areas of a facility 14. The asset movement data provides subscribers with information regarding unauthorized movement of assets. The poll results provide subscribers an inventory of tag assets at a particular facility 14.

The video data 164 may include associated audio clips and is generated by the cameras at the monitored facilities 14. The video data may include video of personnel entering and leaving a monitored facility 14, personnel movement within the facility 14, customer video and purchase transaction video. Personnel access video may be provided to a subscriber 18 as a record of authorized and unauthorized entry by employees and non-employees. Personnel movement video data may be used by the subscriber 18 to evaluate the effectiveness of an employee at his or her job functions. Such functions can include performance of job tasks, interaction with customers, and behavior involving customer transactions such as cash handling. Customer video data may be used by subscribers 18 to provide information regarding customer behavior in buying circumstances such as attractiveness to product displays. The register transaction videos provide protections for the subscriber against theft.

The combined format data 166 stores location and video information together to provide enhanced services and higher order information for subscribers 18. Location and video information may be stored together by being stored in a common file, by being stored in a common element of a database, or being linked or otherwise associated with each other.

The applications 152 include a facility access program 180, database access program 182, alert processor 184, report generator 186, remote video controller 188, remote access controller 190, and remote location, or RFID, controller 192. The applications each comprise software stored on a computer-readable medium and executed by a processor of the host 16. It will be understood that the functionality of the central host 16 may be otherwise suitably separated into disparate applications.

The facility access program 180 provides operators and subscribers 18 with direct access to the local computer system 78 of the monitored facilities 14. The database access program 182 provides access to the database 150. Accordingly, an operator at the central host 18 can perform special requests and processing of information stored at the central host 18 or at the monitored facility 14.

The alert processor 184 receives alerts generated by the monitored facilities 14 and/or generates alerts and response to information uploaded from the monitored facilities 14. As described in more detail below, the alert processor notifies the subscribers 18 of an alert condition in order to allow them to suitably respond. The alerts may be a burglar alarm, a fire alarm, or subscriber-defined operation conditions such as less than a minimum number of employees at a facility or performing a specified function at a facility.

The report generator 186 processes information in the activity records 160 to generate user-required and/or specified reports. The reports allow a subscriber to quickly determine the operational status of a monitored facility 14 based on certain categories of information. The reports can be accessed on the central host 16 or transmitted to the subscriber 18.

The remote video controller 188 provides operators and subscribers 18 with direct access to and control of the video cameras in the monitored facilities 14. Thus, an operator may look into any of the monitored facilities 14 at any time. Typically, an operator would use the remote video controller 188 to look into a monitored facility 14 in response to an alarm or other alert condition. In one embodiment, the remote video control 188 is implemented as the prism MOLE software. The MOLE application allows full pan, tilt, and zoom camera control. In addition, the MOLE product supports black and white, color, and infrared video images and provides an intuitive graphical user interface (GUI) for remotely controlling the cameras.

The remote access controller 190 provides operators and subscribers with remote access functionality at the central host 16. As described in more detail below, this enables an operator at the central host 16 to control access doors at the monitored facilities 18 to allow ingress and egress of employees and other personnel. This subscriber 18 may use the remote access controller 190 to similarly control access doors at the monitored facility 18. The doors at monitored facilities 14 may include gates and other entry and exit ways.

The remote RFID controller 192 allows operators and subscribers to access and control an RFID system, or components of an RFID system at a monitored facility 14. For example, an operator at the central host 16 or a subscriber 18 may initiate polling operations at a monitored facility to track inventory at that facility 14. In this way, inventory may be remotely polled on a periodic basis, at specified times, or at any random time by the subscriber 18.

The central host 16 implements an Internet website to allow subscribers 18 to connect to the host and view the location data, video data, and process result data. In one embodiment, the subscriber 18 is given an authorization number to ensure privacy of the data being viewed. The website, or portal, may present options to the subscriber 18 for live video viewing at any location, viewing recorded video clips of key operational events, viewing data from location reads such as time and attendance by employees and asset movements, and viewing data from asset inventory polls. The subscribers 18 may also receive e-mail alerts which may include alarm messages of events that require immediate attention. The e-mail alerts may include video, snapshots, or clips of key events.

Figure 4:
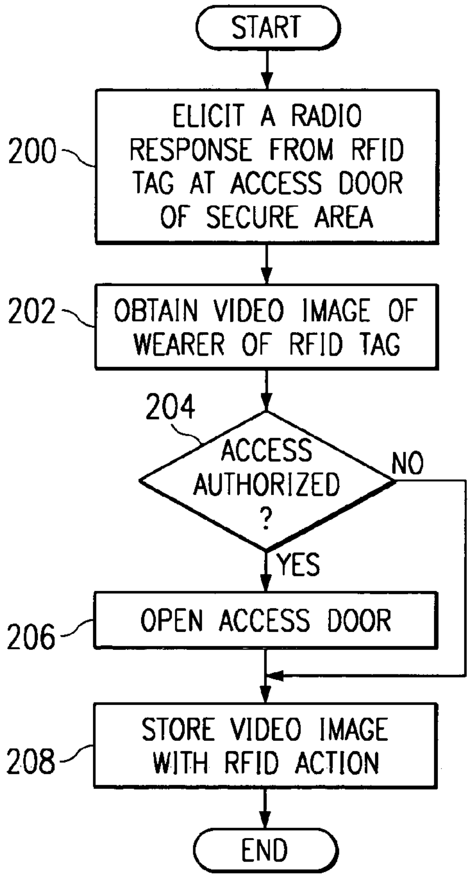
FIG. 4 is a flow diagram illustrating a method for providing identity verification service for a subscriber of the monitoring system of FIG. 1 in accordance with one embodiment of the present invention.

FIG. 4 is a flow diagram illustrating a method for providing identity verification services to subscribers 18 for RFID reads at a monitored facility 14 in accordance with one embodiment of the present invention. The method begins at step 200 in which a radio response is elicited from an RFID tag at an access door of a secure area of a monitored facility 14.

Next, at step 202, one or more video images of the wearer of the RFID tag is obtained from a camera covering the access door. The video image may be obtained in response to the radio response, authorized access, or an attempt at unauthorized access.

Proceeding to decisional step 204, it is determined if the requested access is authorized based on the radio response from the RFID tag. If access is authorized, the Yes branch of decisional step 204 leads to step 206 in which the access door is opened. If access is not authorized, the No branch of decisional step 204 along with step 206 leads to step 208.

At step 208, the video image is stored with the RFID action to provide video verification of the event. The video image may be stored with the RFID action by being stored as part of a same file, database entry, linked, or otherwise associated with the action.

Figure 5:
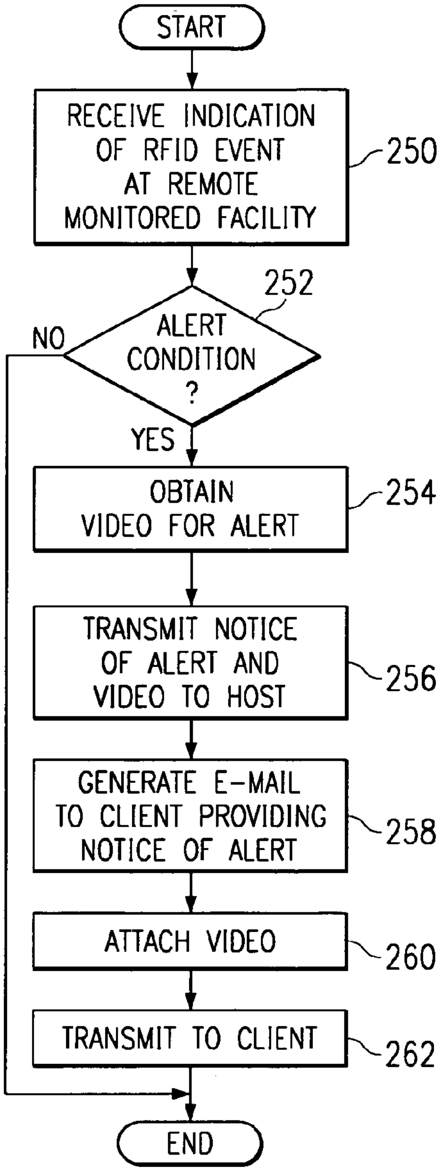
FIG. 5 is a flow diagram illustrating a method for providing alert notification services for a subscriber of the monitoring system of FIG. 1 in accordance with one embodiment of the present invention.

FIG. 5 illustrates a method for providing an alert notification service to subscribers 18 in accordance with one embodiment of the present invention. In this embodiment, the alert is initially generated at a monitored facility 18 by a local computer system and transferred to the central host 16 for processing and transmittal to the subscriber 18. It will be understood that the alert may be generated by the central host 16 based on received and processed data. In this embodiment, information relevant to the alerts is preferably streamed from the monitored facilities 14 to the central host 16 for continuous processing.

Referring to FIG. 5, the method begins at step 250 in which a location or other RFID event is received at a monitored facility 14. Next, at decisional step 252, it is determined whether the event is associated a pre-defined alert condition. The alert condition may be a burglar or fire alarm, or operational data above or below operational limits. If the event is not associated with an alert condition, no immediate notification to the subscriber 18 is necessary and the No branch of decisional step 252 leads to the end of the process. If the event is associated with an alert condition, the Yes branch of decisional step 252 leads to step 254.

At step 254, a video image providing information about the RFID event may be obtained. The video image may be obtained by triggering a camera covering an area in which the RFID event occurred or by retrieving video recorded at the time of the event. Next, at step 256, notice of the alert and any attached video images are transmitted to the central host 14 for processing.

Proceeding to step 258, the alert processor 184 at the central host 16 generates an e-mail to the subscriber providing notice of the alert condition. For example, the e-mail may include a textural message indicating the monitored facility 14 at which the event occurred, the type of the event, and the time of the event. At step 260, the video image is attached to the e-mail and the complete message transmitted to the subscriber 18 at step 262. In this way, subscribers 18 are immediately notified of any events to which immediate action may be required.

Figure 6:
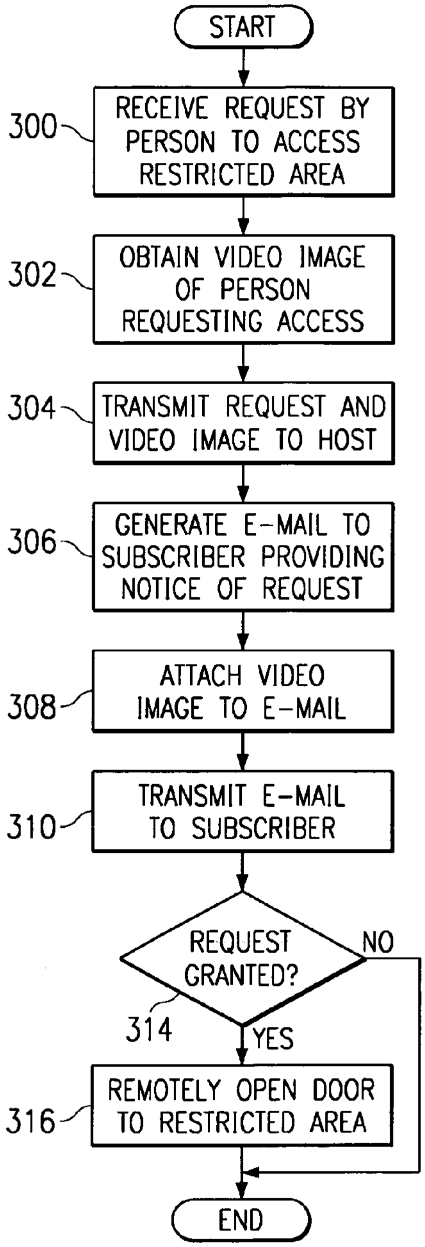
FIG. 6 is a flow diagram illustrating a method for providing remote access services for a subscriber of the monitoring system of FIG. 1 in accordance with one embodiment of the present invention.

FIG. 6 is a flow diagram illustrating a method for providing remote access services for subscribers 18 in accordance with one embodiment of the present invention. In this embodiment, requests for remote access are processed by the central host 16 and forwarded to the subscriber 18 for approval. It will be understood that an operator at the central host 16 may provide requested access based on instructions by the subscriber 18.

Referring to FIG. 6, the method begins at step 300 in which a request by a person to access a restricted area is received at a monitored facility 14. At step 302, a video image of the person requesting access is obtained. The video image may be obtained by triggering the camera covering the access door from which the request was received.

Proceeding to step 304, the request and the video image are transmitted to the central host 16. At the central host 16, the remote access controller 190 generates an e-mail to the subscriber 18 providing notice of the request. At step 308, the video image is attached to the e-mail and the completed e-mail transmitted to the subscriber at step 310.

Next at decisional step 314, if the subscriber grants the request, the Yes branch leads to step 316 in which the access door is remotely opened. The door may be opened by the subscriber 18 via the central host 16 or by an operator at the central host 16 in response to approval of the request by the subscriber 18.

Step 316 as well as the No branch of decisional step 314 lead to the end of the process. In this way, after-hour deliveries and other access may be allowed without the need to maintain employees at a facility. Accordingly, operational expenses for the business are reduced.

Figure 7:
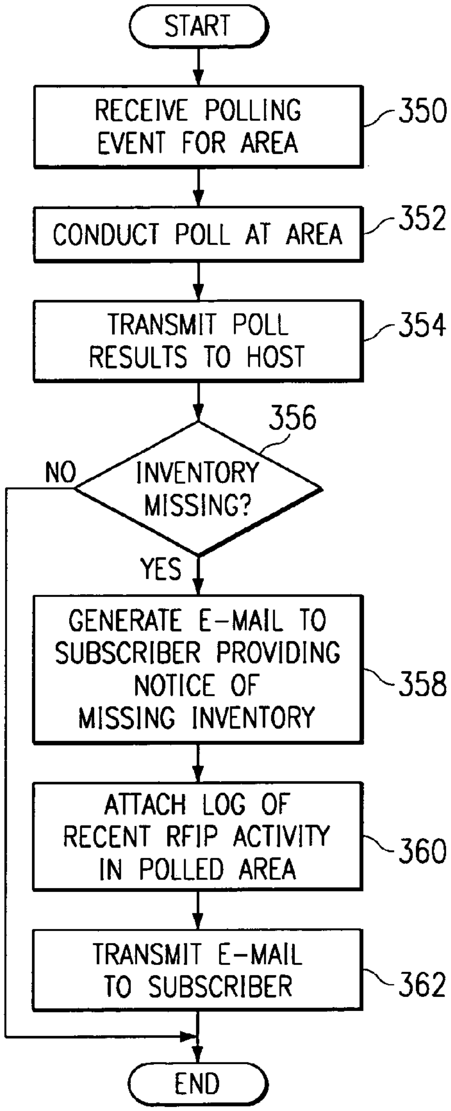
FIG. 7 is a flow diagram illustrating a method for providing location control services for a subscriber of the monitoring system of FIG. 1 in accordance with one embodiment of the present invention.

FIG. 7 is a flow diagram illustrating a method for providing remote polling services for subscribers 18 in accordance with one embodiment of the present invention. The method begins at step 350 in which a polling event is received for an area at a monitored facility 18. The polling event may be a specified time, the elapse of a period of time, or a response to a request by the subscriber 18 or an operator at the central host 16. In addition, the polling event may be an RFID event within the area to be polled.

Next, at step 352, a poll is conducted of the area for tagged inventory. In accordance with conventional radio tag operations, each tag responds to a polling event by identifying itself and providing any other relevant information. At step 354, the results of the poll are transmitted to the central host 16 for processing. Proceeding to decisional step 356, the central host 16 determines whether any inventory is missing. This may be accomplished by comparing the inventory results to previous inventory results and accounting for any items for which removal was authorized, such as sold items. If no inventory is missing, no notification to the subscriber is needed and the No branch of decisional step 356 leads to the end of the process. If inventory is missing, the Yes branch of decisional step 356 leads to step 358.

At step 358, the remote RFID controller 192 generates an e-mail to the subscriber 18 providing notice of the missing inventory. At step 360, the controller 192 may attach a log of recent RFID activity in the area at which the missing inventory was discovered. The completed e-mail is transmitted to the subscriber 18 at step 362. This way, a subscriber 18 may be immediately notified of any missing inventory and may take suitable action.

Although the present invention has been described with several embodiments, various changes and modifications may be suggested to one skilled in the art. It is intended that the present invention encompass such changes and modifications as fall within the scope of the appended claims.

What is claimed is:

1. A method for providing integrated remote monitoring services, comprising:

receiving and storing radio frequency identification (RFID) data from an RFID system at a remote facility of a subscriber;

receiving and storing video data from a video system at the facility;

providing the subscriber with access to the stored RFID and video data;

providing the subscriber with access to and control of a video camera in the video system at the facility; and processing the RFID data to generate a report for the subscriber.

2. The method of claim 1, wherein the RFID and video information is received over the Internet and the subscriber is provided with access to the stored data and to the video camera through a web portal.

3. The method of claim 1, further comprising processing the RFID data to determine whether an alert condition exists and notifying the subscriber if an alert condition exists.

4. The method of claim 3, wherein the alert is a subscriber-defined alert.

5. The method of claim 3, further comprising generating an e-mail and transmitting the e-mail to the subscriber to notify the subscriber of the alert condition.

6. The method of claim 3, wherein the alarm condition comprises less than a minimum number of employees in attendance at the facility.

7. The method of claim 3, wherein the alarm condition comprises less than a minimum number of employees performing a specified function.

8. The method of claim 1, further comprising:

initiating a polling event in response to a specified event, the polling event operable to use the RFID system at the facility to poll an area of the facility to determine an inventory of tagged items within the area; and receiving results of the polling event.

9. The method of claim 8, wherein the specified event is a pre-defined time.

10. The method of claim 8, wherein the specified event is a periodic event.

11. The method of claim 8, further comprising:

determining whether all items have been accounted for based on the polling results; and generating an alert in response to unaccounted for items.

12. The method of claim 1, wherein the report is a subscriber-defined report.

13. The method of claim 1, wherein the report comprises time and attendance records of the employees of the subscriber at the facility.

14. A method for providing identity verification for access to a secure area, comprising:

eliciting a radio response from a radio frequency identification (RFID) tag at an access door of a secure area;

determining whether access by a wearer of the RFID tag to the secure area is authorized based on the radio response;

recording a video image of the wearer of the RFID tag at the access door; and controlling access to the door to provide access to the secure area by the wearer only if access by the wearer is authorized.

15. The method of claim 14, further comprising recording the video image in response to authorized access.

16. The method of claim 14, further comprising recording the video image in response to an attempt at unauthorized access.

17. The method of claim 14, further comprising recording the video image in response to the radio response from the RFID tag.

18. The method of claim 14, further comprising recording a series of video images of the wearer of the RFID tag at the access door.

19. A method for remotely notifying a subscriber of an alert condition at a facility, comprising:

receiving a radio frequency identification (RFID) action from an RFID system at a facility;

determining whether the RFID action corresponds to a pre-defined alert condition;

obtaining a video image associated with the RFID action only if the RFID action corresponds to a pre-defined alert condition; and electronically transmitting notice of the alert condition along with the video image for delivery to a manager of the facility.

20. The method of claim 19, further comprising electronically mailing the notice of the alert condition along with the video image over the internet to the manager of the facility.

21. The method of claim 20, further comprising obtaining and electronically transmitting a series of video images associated with the RFID action.

22. The method of claim 19, wherein the RFID action comprises access to a specified area.

23. The method of claim 19, further comprising:

determining whether an expected RFID action has occurred by a specified time; and electronically transmitting a notice that the expected RFID action has not occurred to the manager of the facility in response to determining that the expected RFID action has not occurred.

* * * * *